(12) United States Patent
Nagano et al.

(10) Patent No.: US 7,199,851 B2
(45) Date of Patent: Apr. 3, 2007

(54) LIQUID CRYSTAL DISPLAY DEVICE

(75) Inventors: Shingo Nagano, Kumamoto (JP); Yuichi Masutani, Kumamoto (JP)

(73) Assignee: Advanced Display Inc., Kumamoto (JP)

( * ) Notice: Subject to any disclaimer, the term of this patent is extended or adjusted under 35 U.S.C. 154(b) by 70 days.

(21) Appl. No.: 10/790,821

(22) Filed: Mar. 3, 2004

(65) Prior Publication Data
US 2004/0183976 A1    Sep. 23, 2004

(30) Foreign Application Priority Data
Mar. 20, 2003  (JP) .............................. 2003-078306

(51) Int. Cl.
*G02F 1/1343* (2006.01)
(52) U.S. Cl. .................... 349/141; 349/54; 349/192
(58) Field of Classification Search ................ 349/141, 349/54, 192
See application file for complete search history.

(56) References Cited
U.S. PATENT DOCUMENTS
6,704,085 B2    3/2004  Nishimura et al.
6,982,706 B1    1/2006  Doi et al.
2001/0002146 A1* 5/2001 Komatsu .................... 349/141
2001/0052889 A1* 12/2001 Fukunishi .................... 345/87
2002/0149729 A1* 10/2002 Nishimura et al. ......... 349/141
2004/0263755 A1* 12/2004 Kim et al. ................... 349/141

FOREIGN PATENT DOCUMENTS
JP    2000-131714   5/2000
JP    2001-033814   2/2001
KR    2002-0070067  9/2002

* cited by examiner

*Primary Examiner*—David Helms
*Assistant Examiner*—Thanh-Nhan P. Nguyen
(74) *Attorney, Agent, or Firm*—Oblon, Spivak, McClelland, Maier & Neustadt, P.C.

(57) ABSTRACT

A liquid crystal display device displays images by applying an electric field substantially parallel to an insulating substrate between a pixel electrode and a common electrode placed across from each other. The liquid crystal display device has a capacitor terminal connected to the pixel electrode and placed opposite to a capacitor electrode with an insulating layer therebetween. The pixel electrode has at least two voltage supply paths to the capacitor terminal.

8 Claims, 2 Drawing Sheets

LIQUID CRYSTAL DISPLAY DEVICE

BACKGROUND OF THE INVENTION

1. Field of the Invention

The present invention relates to an in-plane switching mode active matrix liquid crystal display device that displays images by applying a voltage across an electrode pair in the direction substantially parallel to a substrate.

2. Description of the Related Art

In-plane switching mode has been increasingly employed in liquid crystal display devices. In-plane switching mode liquid crystal display devices display images by applying an electric field substantially parallel to an insulating substrate between a pixel electrode and a common electrode placed across from each other to align liquid crystals. The in-plane switching mode operation minimizes viewing-angle-based gray-scale inversion and deterioration in contrast ratio. In conventional in-plane switching mode liquid crystal display devices, however, there is only one path per pixel for a voltage to be supplied through a pixel electrode to a capacitor terminal. The capacitor terminal, connected to the pixel electrode, is placed opposite to a capacitor electrode with an insulating layer interposed therebetween to generate capacitance.

For example, a technique disclosed in Japanese Unexamined Patent Application Publication No. 2000-131714 and illustrated in FIG. 1 provides only one voltage supply path through the pixel electrode to the capacitor terminal in at least one pixel. Thus, if a pixel electrode line from a connection of the pixel electrode and a drain electrode to a connection of the pixel electrode and the capacitor terminal is disconnected due to contaminants generated during processing and so on, no voltage is supplied to the capacitor terminal, making it unable to generate the necessary capacitance. This causes defects such as display flicker.

For another example, Japanese Unexamined Patent Application Publication No. 2001-33814 and illustrated in FIG. 1 describes the structure in which the pixel electrode and the capacitor terminal are formed in the same conductive layer. This technique also provides only one voltage supply path through the pixel electrode to the capacitor terminal (which is referred to as a capacitor part in this publication) in at least one pixel. Thus, if a pixel electrode line from a connection of the pixel electrode and a drain electrode to a connection of the pixel electrode and the capacitor terminal (the capacitor part) is disconnected due to contaminants generated during processing and so on, no voltage is supplied to the capacitor terminal. It is thus unable to generate the necessary capacitance, producing defects such as display flicker.

SUMMARY OF THE INVENTION

In view of the foregoing, it is an object of the present invention to provide a liquid crystal display device with high display quality, capable of supplying a voltage to a capacitor terminal to generate the necessary capacitance even when a pixel electrode is disconnected.

To these ends, according to one aspect of the present invention, there is provided a liquid crystal display device including an insulating substrate; a plurality of pixels formed in the insulating substrate; a pixel electrode formed in at least one pixel of the plurality of pixels, a common electrode formed in at least one pixel of the plurality of pixels and placed across from the pixel electrode; a capacitor electrode connected to the common electrode; a scan line formed substantially parallel to the capacitor electrode; a signal line formed to cross the scan line with an insulating layer therebetween, for supplying a signal to the pixel electrode; a counter substrate placed opposite to the insulating substrate with liquid crystals filled therebetween; and a capacitor terminal placed opposite to the capacitor electrode with the insulating layer therebetween to generate capacitance, and connected to the pixel electrode, wherein the liquid crystal display device displays images by applying an electric field substantially parallel to the insulating substrate between the pixel electrode and the common electrode to align the liquid crystal, and the pixel electrode comprises at least two voltage supply paths to the capacitor terminal.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
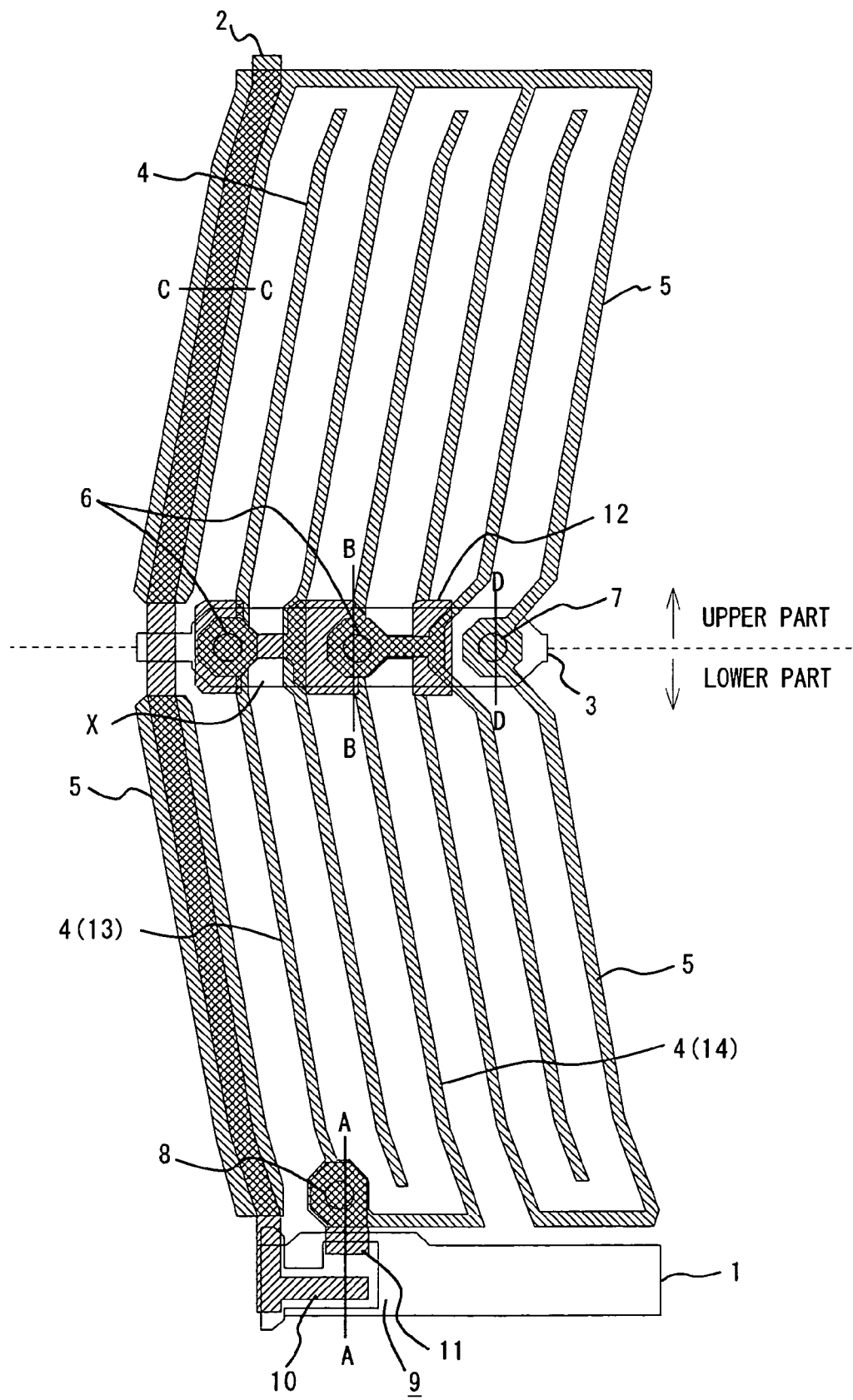
FIG. 1 shows a plan view of approximately one pixel of a liquid crystal display device according to one embodiment of the present invention.
Figure 2:
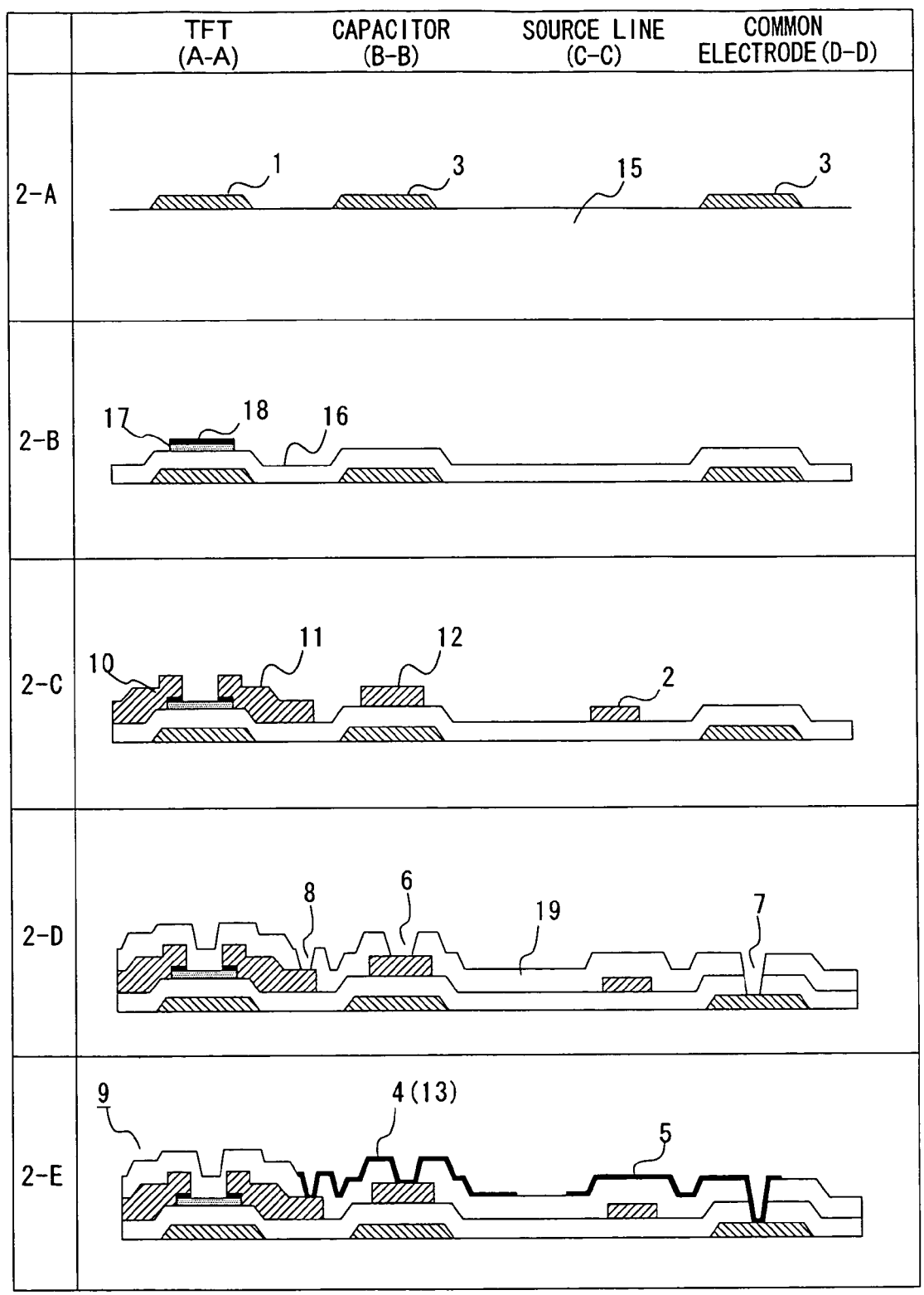
FIG. 2 shows manufacturing step diagrams illustrating cross-sections along line A—A to D—D in FIG. 1.

An embodiment of the present invention will be explained hereinafter with reference to FIGS. 1 and 2. FIG. 1 shows a plan view of approximately one pixel of a liquid crystal display device according to the embodiment of the present invention. FIG. 2 shows manufacturing step diagrams illustrating cross-sections along line A—A to D—D in FIG. 1.

The liquid crystal display device according to the embodiment of the present invention will be explained using FIG. 1 with reference to the manufacturing step diagrams in FIG. 2. Firstly, as shown in FIG. 2-A, a metal such as Cr, Al, Ti, Ta, Mo, W, Ni, Cu, Au, or Ag, an alloy composed mainly of these metals, a light transmitting conductive film such as Indium Tin Oxide (ITO), or a lamination of these films is deposited on an insulating substrate 15 by sputtering, vapor deposition, or other methods. Then, a scan line 1 including a gate electrode of a thin-film transistor 9 and a capacitor electrode 3 substantially parallel to the scan line 1 are formed by a photolithography process of the deposited metal. The capacitor electrode 3 is located approximately in the middle of a pixel in the direction of a signal line 2 which will be described later. Placing the capacitor electrode 3 in this position prevents short-circuit between the scan line 1 and the capacitor electrode 3. Secondly, as shown in FIG. 2-B, a gate insulating layer 16 formed of silicon nitride and so on is deposited. Further, a semiconductor layer 17 formed of amorphous silicon (a-Si) or polysilicon (poly-Si), and a contact layer 18 formed of $n^+$ a-Si or $n^+$ poly-Si highly doped with impurity such as P in the case of N-type TFT are successively deposited by plasma chemical vapor deposition (CVD), atmospheric pressure CVD, or low-pressure CVD, for example. Then, the semiconductor layer 17 and the contact layer 18 are patterned into island shapes in a given area.

Thirdly, as shown in FIG. 2-C, a metal such as Cr, Al, Ti, Ta, Mo, W, Ni, Cu, Au, or Ag, an alloy composed mainly of these metals, a light transmitting conductive film such as ITO, or a lamination of these films is again deposited by sputtering or vapor deposition. Then, the signal line 2, a source electrode 10, a drain electrode 11, and a capacitor terminal 12 are formed by photolithography and microfabrication processes. The capacitor terminal 12 is placed to overlap with the capacitor electrode 3 approximately in the middle of the pixel in the direction of the signal line 2. Capacitance is generated between the capacitor electrode 3 and the capacitor terminal 12 with the gate insulating layer 16 interposed therebetween as shown in FIGS. 1 and 2. The contact layer 18 is then etched away from a channel area of the thin-film transistor 9 using as an etch mask the source electrode 10 and the drain electrode 11, or a photoresist used for their formation.

Fourthly, as shown in FIG. 2-D, an insulating layer 19 formed of silicon nitride, silicon oxide, inorganic insulating film, organic resin, or the like is deposited. Then, contact holes 6, 7, and 8 are created by the photolithography process and subsequent etching process. The contact hole 6 is for connecting a pixel electrode 4 and the capacitor terminal 12, the contact hole 7 is for connecting a common electrode 5 and the capacitor electrode 3, and the contact hole 8 is for connecting the pixel electrode 4 and the drain electrode 11. The contact hole 6 for the connection of the pixel electrode 4 and the capacitor terminal 12 is provided at two places in the area of the capacitor terminal 12. The pixel electrode 4 and the capacitor terminal 12 are thus connected through the two contact holes. The gate electrode, the source electrode 10, the drain electrode 11, the gate insulating layer 16, the semiconductor layer 17, the contact layer 18 and so on constitute the thin-film transistor 9 in the insulating substrate 15.

Finally, as shown in FIG. 2-E, a metal such as Cr, Al, Ti, Ta, Mo, W, Ni, Cu, Au, or Ag, an alloy composed mainly of these metals, a light transmitting conductive film such as ITO, or a lamination of these films is deposited and patterned to form the pixel electrode 4 and the common electrode 5. The pixel electrode 4 serves as a voltage supply path through which a voltage from the drain electrode 11 is supplied to the capacitor terminal 12. To provide a plurality of voltage supply paths (two paths in FIG. 1) to the capacitor terminal 12, the pixel electrode 4 is divided into two segments: a first voltage supply path 13 and a second voltage supply path 14. Thus, the two voltage supply paths 13 and 14 are provided between the connection of the pixel electrode 4 to the drain electrode 11 and the connection of the pixel electrode 4 to the capacitor terminal 12. Further, since the pixel electrode 4 and the common electrode 5 are placed across from each other, an electric field is applied substantially parallel to the insulating substrate 15. In the configuration shown in FIGS. 1 and 2, the pixel electrode 4 and the common electrode 5 are formed in the same conductive layer to simplify the manufacturing process.

With the insulating substrate produced by the above process, a counter substrate (not shown) is placed face to face with liquid crystals filled therebetween. A liquid crystal display device is thereby produced.

As described in the foregoing, providing at least two voltage supply paths to the capacitor terminal in the pixel makes it possible to supply a voltage to the capacitor terminal to maintain the necessary capacitance even when either one of the voltage supply paths is disconnected due to contaminants during processing and so on. A liquid crystal display device with high display quality is thereby achieved.

Although the above embodiment explains a case of providing two voltage supply paths from the drain electrode to the capacitor terminal, it is not restricted thereto, and the same advantages are obtained when providing three, four, or more voltage supply paths. Further, though the above embodiment explains a case where the pixel electrode and the common electrode are formed in the same conductive layer, it is also not restricted thereto, and they maybe formed in different conductive layers. If the capacitor terminal and the pixel electrode are formed in the same conductive layer, the contact hole for connecting the capacitor terminal and the pixel electrode is not needed. In this case also, the same advantages are obtained by providing a plurality of voltage supply paths to the capacitor terminal.

In this embodiment, there is provided a pair of voltage supply paths from the capacitor electrode to the common electrode, one for the upper and one for the lower part of the pixel from the capacitor electrode in FIG. 1. With this configuration, if either or both of these paths is disconnected, a voltage is not sufficiently supplied to either or both of the upper and lower common electrodes from the capacitor electrode in the pixel. In order to prevent this problem, in an effective configuration, another contact hole for connecting the common electrode 5 and the capacitor electrode 3 is preferably created to provide two pairs of voltage supply paths from the capacitor electrode 3 to the common electrode 5, two for the upper and two for the lower part of the pixel from the capacitor electrode 3. In this case, a part where the capacitor terminal 12 is not located above the capacitor electrode 3 is formed in an area X in FIG. 1 for example, and the contact hole is created there to connect the common electrode 5 and the capacitor electrode 3. This configuration enables a stable voltage supply from the capacitor electrode to the common electrode.

The present invention is not restricted to the layer structure and the lamination order described in the above embodiment. The invention is applicable to any liquid crystal display devices having the pixel electrode for supplying a voltage to the capacitor terminal.

The present invention is able to provide a liquid crystal display device with high display quality, capable of generating the necessary capacitance even when a pixel electrode for supplying a voltage to a capacitor terminal is disconnected.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device comprising:
   an insulating substrate;
   a plurality of pixels formed in the insulating substrate;
   a pixel electrode formed in at least one pixel of the plurality of pixels,
   a common electrode formed in at least one pixel of the plurality of pixels and placed across from the pixel electrode;
   a capacitor electrode connected to the common electrode;
   a scan line formed substantially parallel to the capacitor electrode;
   a signal line formed to cross the scan line with an insulating layer therebetween, for supplying a signal to the pixel electrode;
   a counter substrate placed opposite to the insulating substrate with liquid crystals filled therebetween;
   a capacitor terminal placed opposite to the capacitor electrode with the insulating layer therebetween to generate capacitance, and connected to the pixel electrode through at least two contact holes created in a second insulating layer above the capacitor terminal; and a drain electrode electrically connected to the capacitor terminal through the pixel electrode;

wherein the liquid crystal display device displays images by applying an electric field substantially parallel to the insulating substrate between the pixel electrode and the common electrode to align the liquid crystal, and the pixel electrode comprises at least two voltage supply paths to the capacitor terminal.

2. A liquid crystal display device according to claim 1, further comprising:

a gate electrode connected to the scan line;

a source electrode connected to the signal line; and a drain electrode placed opposite to the source electrode and connected to the pixel electrode, wherein the at least two voltage supply paths to the capacitor terminal in the pixel electrode are provided between a connection of the pixel electrode to the drain electrode and a connection of the pixel electrode to the capacitor terminal.

3. A liquid crystal display device according to claim 2, wherein the pixel electrode and the common electrode are formed in the same conductive layer.

4. A liquid crystal display device according to claim 2, wherein the capacitor electrode and the capacitor terminal are located approximately in a middle of the pixel in a direction of the signal line.

5. A liquid crystal display device according to claim 1, wherein the pixel electrode and the common electrode are formed in the same conductive layer.

6. A liquid crystal display device according to claim 5, wherein the capacitor electrode and the capacitor terminal are located approximately in a middle of the pixel in a direction of the signal line.

7. A liquid crystal display device according to claim 1, wherein the capacitor electrode and the capacitor terminal are located approximately in a middle of the pixel in a direction of the signal line.

8. A liquid crystal display device, comprising:

an insulating substrate;

a plurality of pixels formed in the insulating substrate;

a pixel electrode formed in at least one pixel of the plurality of pixels, a common electrode formed in at least one pixel of the plurality of pixels and placed across from the pixel electrode;

a capacitor electrode connected to the common electrode; and a capacitor terminal placed opposite to the capacitor electrode with an insulating layer therebetween to generate capacitance, and connected to the pixel electrode through at least two contact holes created in a second insulating layer above the capacitor terminal, wherein the liquid crystal display device displays images by applying an electric field substantially parallel to the insulating substrate between the pixel electrode and the common electrode.

* * * * *